US00RE49832E

(19) United States
(12) Reissued Patent
Totemeier et al.

(10) Patent Number: US RE49,832 E
(45) Date of Reissued Patent: Feb. 13, 2024

(54) ULTRA-COMPACT PROFILE ACTUATION SYSTEM FOR AN ADJUSTABLE BED

(71) Applicant: Ergomotion, Inc., Goleta, CA (US)

(72) Inventors: Hunter Davis Totemeier, Santa Ynez, CA (US); Brett Anthony Towe, Goleta, CA (US); Joey Krueger, Goleta, CA (US); Joseph Ermalovich, Santa Barbara, CA (US)

(73) Assignee: Ergomotion, Inc., Goleta, CA (US)

(21) Appl. No.: 17/520,294

(22) Filed: Nov. 5, 2021

Related U.S. Patent Documents

Reissue of:
(64) Patent No.: 10,463,551
Issued: Nov. 5, 2019
Appl. No.: 15/427,546
Filed: Feb. 8, 2017

U.S. Applications:
(60) Provisional application No. 62/293,137, filed on Feb. 9, 2016.

(51) Int. Cl.

| | |
|---|---|
| ***A47C 20/04*** | (2006.01) |
| ***A61G 7/015*** | (2006.01) |
| ***A47C 20/08*** | (2006.01) |
| ***A47C 20/12*** | (2006.01) |
| ***A61G 7/018*** | (2006.01) |
| ***A61G 7/07*** | (2006.01) |

(52) U.S. Cl.
CPC ..... *A47C 20/041* (2013.01); *A47C 20/08* (2013.01); *A47C 20/12* (2013.01); *A61G 7/015* (2013.01); *A61G 7/018* (2013.01); *A61G 7/07* (2013.01)

(58) Field of Classification Search
CPC ..... A47C 20/12; A61G 7/015; A61G 7/07
USPC ..... 5/613, 614, 616, 617, 618, 619
See application file for complete search history.

(56) References Cited

U.S. PATENT DOCUMENTS 4,543,675 A * 10/1985 Shrock ..... A47C 17/161 5/18.1
5,708,997 A * 1/1998 Foster ..... A61G 7/0506 5/624

(Continued)

*Primary Examiner* — Russell D Stormer
(74) *Attorney, Agent, or Firm* — Bodman PLC

(57) ABSTRACT

An articulating bed incorporates a support frame with a head end, a foot end and having side frame members. A carriage having a seat support is carried by the frame, mounted with wheels engaging the side frame members to translate from a first position through a range progressing toward the head end to a fully translated position. An upper body support is rotatably connected to the carriage and carries a mattress support. At least one telescoping rotation strut is attached at a first end and rotates through an axle pivotally attached to the side frame members. The telescoping rotation strut engages at a second end the upper body support. At least one fixed length rotation arm is carried at a first end by a rotating tube and pivotally attaches to the upper body support at a second end. The rotating tube is mounted on wheels constrained in a track and translates laterally in the track to contact a track end proximate the head end of the frame at a termination of a first range of motion. The telescoping strut approaches a vertical orientation and transfers reaction forces resulting from translation of the carriage to the fixed length rotation arm, whereupon the telescoping rotations struts extend.

12 Claims, 7 Drawing Sheets

(Amended)

(56) References Cited

U.S. PATENT DOCUMENTS

| | | | | |
|---|---|---|---|---|
| 6,393,641 | B1 * | 5/2002 | Hensley | A47C 20/041 5/613 |
| 6,725,474 | B2 * | 4/2004 | Foster | A61G 7/0524 5/604 |
| 7,900,302 | B2 * | 3/2011 | Long | A47C 20/041 5/617 |
| 7,930,780 | B2 * | 4/2011 | Clenet | A47C 20/08 5/618 |
| 8,910,328 | B2 * | 12/2014 | Clenet | A61H 7/015 5/613 |
| 9,038,218 | B1 * | 5/2015 | Heil | A61G 7/16 5/618 |
| 9,049,942 | B2 * | 6/2015 | Huang | A61G 7/018 |
| 9,198,521 | B2 * | 12/2015 | Robertson | A47C 20/041 |
| 2004/0103476 | A1 * | 6/2004 | Barcesat | A47C 20/041 5/618 |
| 2004/0148704 | A1 * | 8/2004 | Tekulve | A47C 20/041 5/618 |
| 2007/0163046 | A1 * | 7/2007 | Eriksson | A47C 20/041 5/618 |
| 2009/0211028 | A1 * | 8/2009 | Richmond | A47C 20/08 5/717 |
| 2013/0025066 | A1 * | 1/2013 | Shih | A47C 21/006 5/694 |
| 2014/0013512 | A1 * | 1/2014 | Turner | A61G 7/015 5/617 |
| 2014/0250599 | A1 * | 9/2014 | Cassell | A61G 7/015 5/613 |
| 2015/0007391 | A1 * | 1/2015 | Xu | A61G 7/018 5/616 |
| 2016/0286970 | A1 * | 10/2016 | Robertson | A47C 20/041 |

* cited by examiner

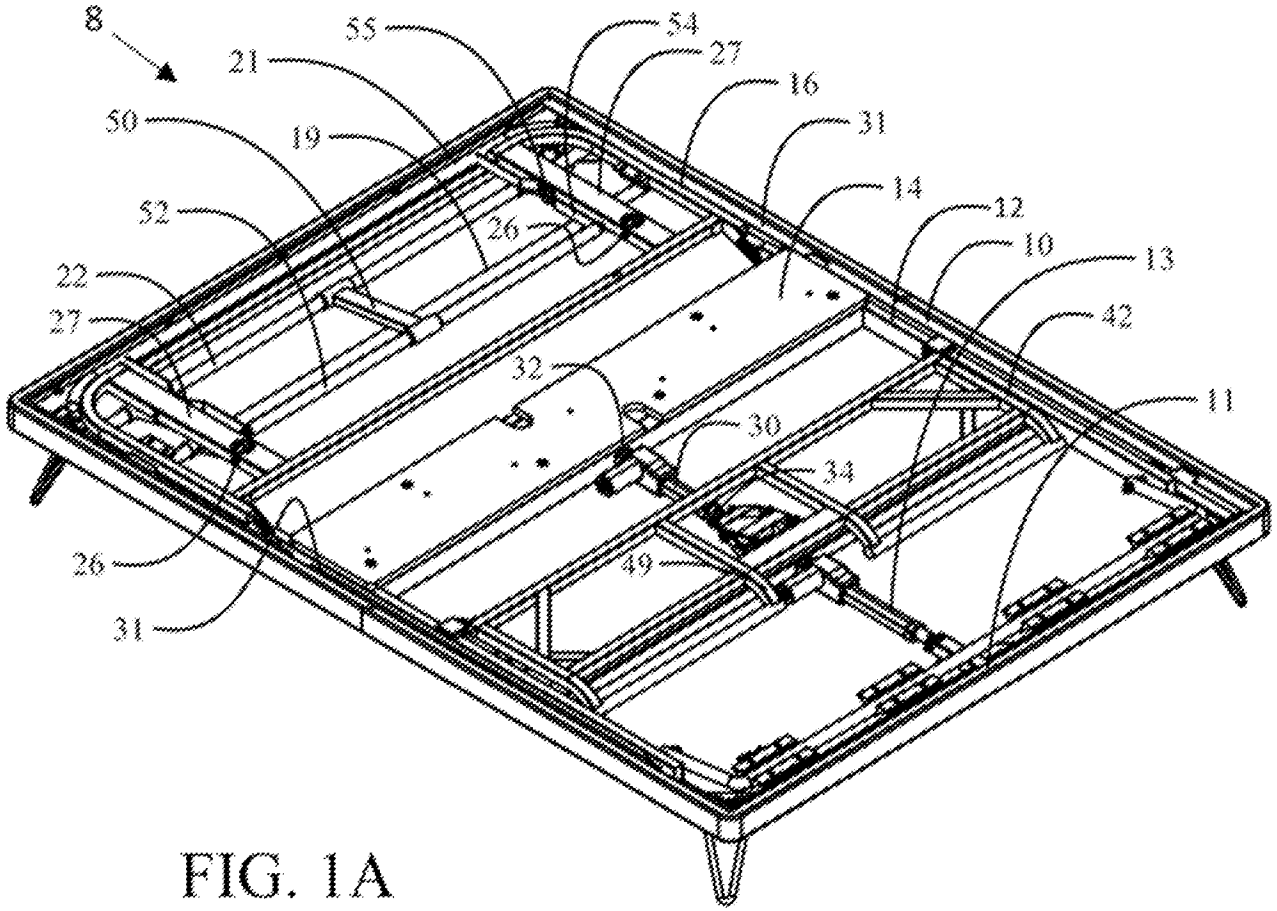
FIG. 1A
(Amended)

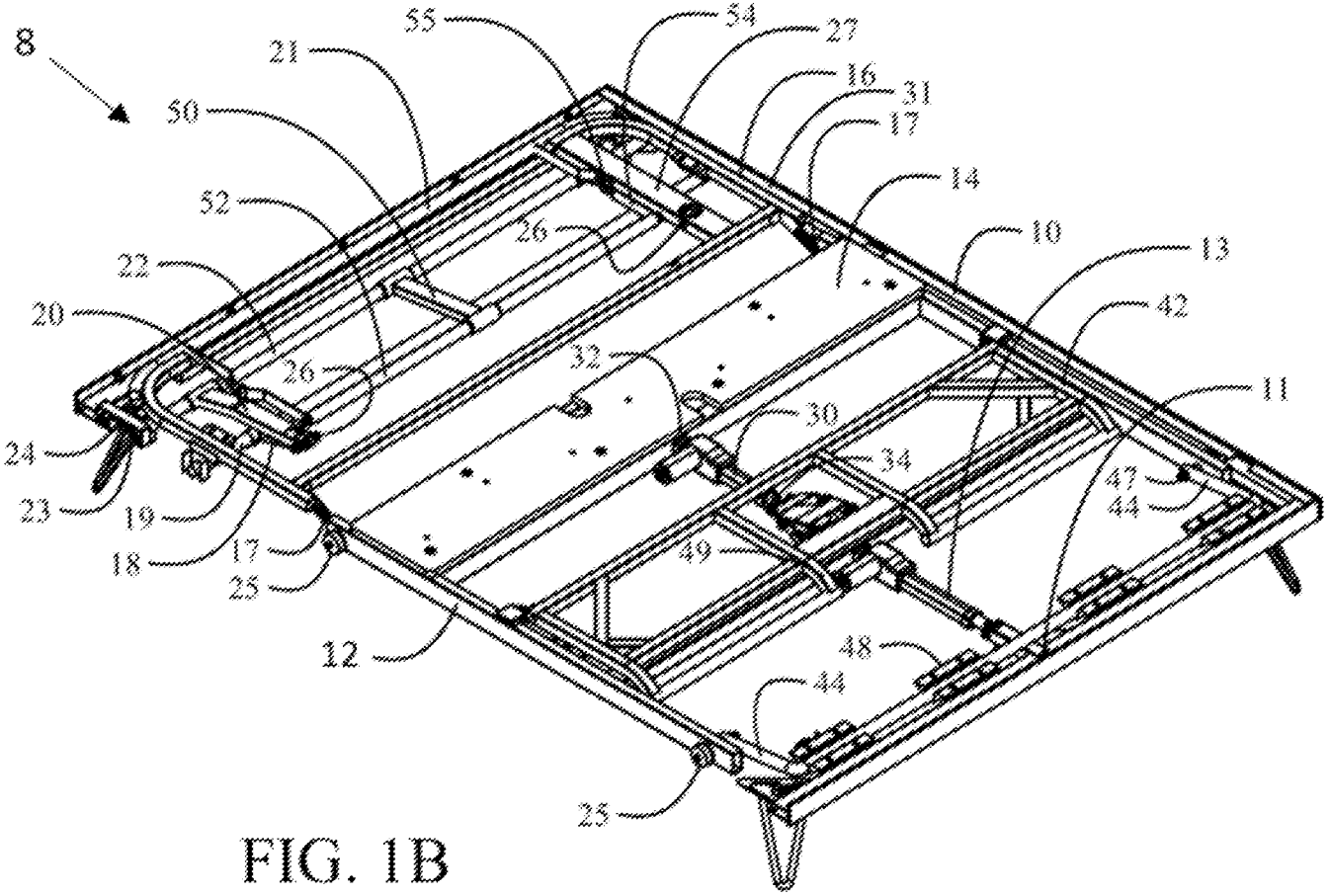
FIG. 1B
(Amended)

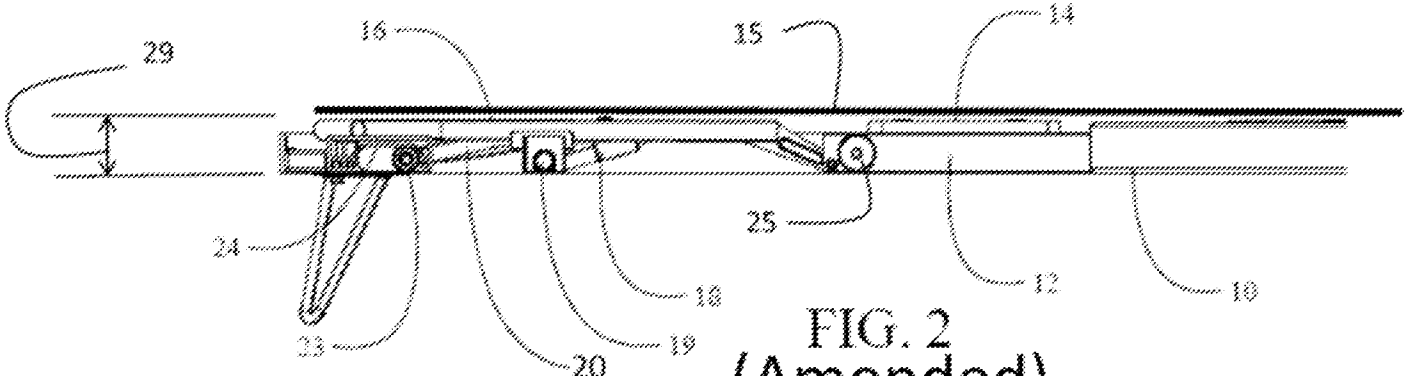
FIG. 2
(Amended)

ULTRA-COMPACT PROFILE ACTUATION SYSTEM FOR AN ADJUSTABLE BED

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

REFERENCE TO RELATED APPLICATIONS

This application *is a reissue application of U.S. Pat. No. 10,463,551, issued on Nov. 5, 2019, from U.S. patent application Ser. No. 15/427,546, filed on Feb. 8, 2017, which* claims priority of U.S. provisional application Ser. No. 62/293,137 filed on Feb. 9, 2016 entitled ULTRA-COMPACT PROFILE ACTUATION SYSTEM FOR AN ADJUSTABLE BED, the [disclosure of which is] *entire contents of each of the above applications are hereby* incorporated [herein] by reference.

BACKGROUND

Field

This invention relates generally to the field of adjustable beds and more particularly to a structure for an articulating bed having a compact actuation system incorporating a two stage lifting mechanism in an upper body support section employing combined fixed length rotating arms and cooperating telescoping struts actuated by a wall-hugger carriage. A scissored leg portion actuating mechanism and an automatic head tilt system complete the structure.

Description of the Related Art

Articulating beds have long been used in hospital and healthcare facilities to allow positioning of a patient in a reclining position, sitting position, elevated leg position or combinations of these positions. General usage of articulating beds has been rapidly expanding due to the comfort and convenience available from adjusting the bed to desired positions for reading, general relaxation or sleeping.

The mechanical structure and drive mechanisms for such articulating beds must be able to support the weight of both a mattress and the occupant. Due to the size, weight, fabrication materials and configuration of the mattress and supporting structure, maintaining rigidity in the system may also be challenging. Typical articulating beds provide an upper body positioning element and a thigh and lower leg positioning element either individually active or with combined actuation. Articulation of the support elements requires actuators which are typically large and require significant angular orientation for leverage and to avoid "dead spots" created by zero angular leverage or overcenter conditions. These typical constructions are bulky with an outdated appearance. They also require bulky packaging which leads to transportation inefficiencies.

However, designs of modern bedding require a reduced thickness profile in side support elements that exposes the actuation system to view. The exposure of the actuation system limits the utility for the adjustable bed to be placed within a variety of bed furniture pieces and can still require bulky packaging It is therefore desirable to provide an articulating bed having a compact profile actuation system adapted to be contained within a reduced thickness profile side support.

SUMMARY

The embodiments disclosed herein overcome the shortcomings of the prior art by providing an articulating bed incorporating a support frame with a head end, a foot end and having side frame members. A carriage having a seat support is carried by the frame, mounted with wheels engaging the side frame members to translate from a first position through a range progressing toward the head end to a fully translated position. An upper body support is rotatably connected to the carriage and carries a mattress support. At least one telescoping rotation strut is attached at a first end and rotates through an axle pivotally attached to the side frame members. The telescoping rotation strut engages at a second end the upper body support whereby translation of the carriage from the first position compressively urges the upper body support against the telescoping rotation struts thereby rotating the at least one telescoping rotation strut and upper body support during a first range of motion of the carriage. At least one fixed length rotation arms is carried at a first end by a rotating tube and pivotally attaches to the upper body support at a second end. The rotating tube is mounted on wheels constrained in a track and translates laterally in the track during the first range of motion and contacts a track end proximate the head end of the frame at a termination of the first range of motion. The telescoping struts approach a vertical orientation at a termination of the first range of motion transferring reaction forces resulting from translation of the carriage to the fixed length rotation arms, whereupon the telescoping rotations struts extend through a second range of motion of the carriage to fully articulate the upper body support section with the carriage in the fully translated position.

BRIEF DESCRIPTION OF THE DRAWINGS

These and other features and advantages of the present invention will be better understood by reference to the following detailed description of exemplary embodiments when considered in connection with the accompanying drawings wherein:

FIG. 1A is a pictorial representation of an embodiment of the ultra-compact profile actuation system with the mattress support removed for clarity;

FIG. 1B is the pictorial representation of FIG. 1A with certain side rail and upper body support elements removed to show additional components;

FIG. 2 is a side section view of a portion of the embodiment showing the upper body support structure in the unarticulated position;

DETAILED DESCRIPTION

Figure 3:
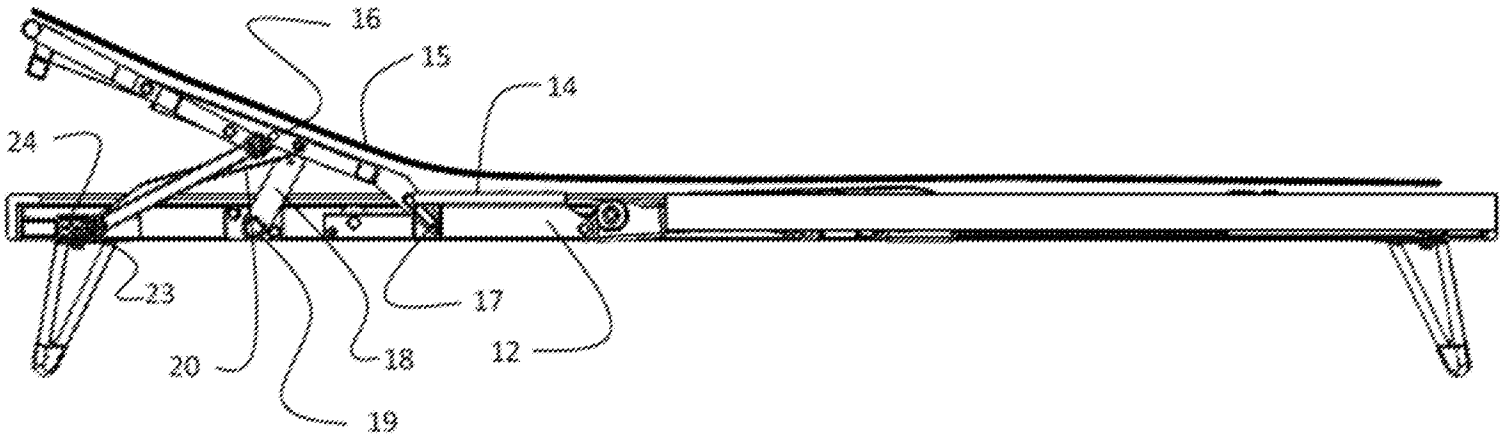
FIG. 3 is a side section view of the embodiment showing the upper body support structure in the partially articulated position.
Figure 4:
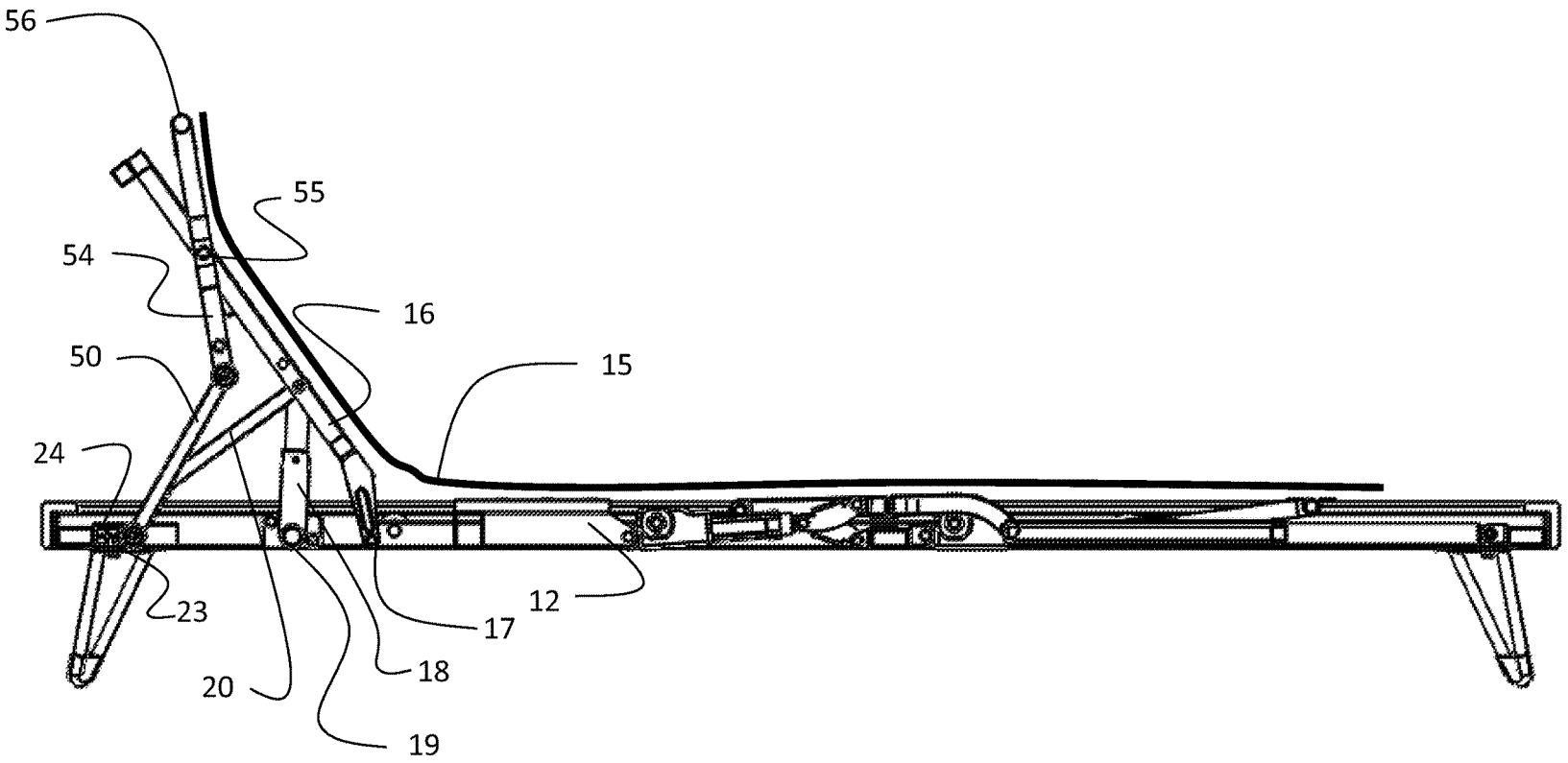
FIG. 4 is a side section view of the embodiment showing the upper body support structure in the fully articulated position.

Embodiments shown in the drawings and described herein provide an actuation system for an articulating bed which may be implemented in a compact vertical space to present a minimum profile for modern bed designs. Referring to the drawings, [FIG. 1] *FIGS. 1A and 1B* illustrates an exemplary embodiment of an adjustable bed 8 incorporating the ultra-compact profile actuation system with the articulating elements of the bed in an unarticulated position. As seen in FIGS. 1A, 1B and 2, in the unarticulated position, a frame 10 carries a translating carriage 12 having a seat support section 14 on which a flexible mattress support 15 is attached. The flexible mattress support and interconnection to the upper body support may be as disclosed in U.S. patent application Ser. No. 13/946,970 having a filing date of Jul. 19, 2013 and entitled ARTICULATING BED WITH FLEXIBLE MATTRESS SUPPORT issued as U.S. Pat. No. 8,910,328 on Dec. 16, 2014 the disclosure of which is incorporated herein by reference. While described herein with respect to a flexible mattress support, rigid support sections for the upper body, seat, thigh support and lower leg support may be employed in alternative embodiments. Carriage 12 is supported on the frame by a plurality of wheels 25 engaged in side frame members 31. An upper body support section 16 is actuated by translation of the carriage 12 toward a head end rail 21 of the frame. The carriage 12 is moved with a first actuator 13 engaged between the carriage and a foot end rail 11. Extension of the first actuator 13 urges the carriage 12 toward the head end of the bed from a first unarticulated position to a second fully articulated position. Motion of the carriage during a first range initially engages a first set of telescoping rotation struts 18, attached at a first end to a rotating axle 19 and reacting in compression to the translational motion of the carriage, to rotate about the axle 19 beginning rotation of the upper body section 16 about hinges 17 attached to the carriage 12 as seen in FIG. 3. A set of fixed length rotation arms 20 is carried at a first end by a rotating tube 22 mounted with wheels 23 for initial lateral translation in a track 24 carried within side frame members 29, with translation of the carriage in the first range of motion. Upon reaching the extent of the track 24 at the head end, the fixed length rotation arms 20 are engaged in compression and with rotation of tube 22 contribute to the further rotation of the upper body section 16. The second end of the telescoping rotation struts 18 and second end of the fixed length rotation arms 20 are commonly pinned at rotation points 26 in frame members 27 of the upper body support section 16 for the embodiment shown. As the telescoping rotation struts 18 approach a vertical orientation, reaction forces [to] *of* translation of the carriage are fully assumed by the fixed length rotation arms 20 and the telescoping rotations struts 18 extend through in a second range of motion of the carriage to fully elevate the upper body support structure as shown in FIG. 4. The configuration of the actuating components, namely the actuator 13, telescoping rotation struts 18 and fixed length rotation arms 20, allows the actuating components to be masked within a vertical profile 29 of the frame 10 and upper body support section 16 (best seen in FIG. 2) with the bed in the first unarticulated position. This allows the minimum profile for the overall frame and articulating structure of the bed desired in modern designs.

Figure 7:
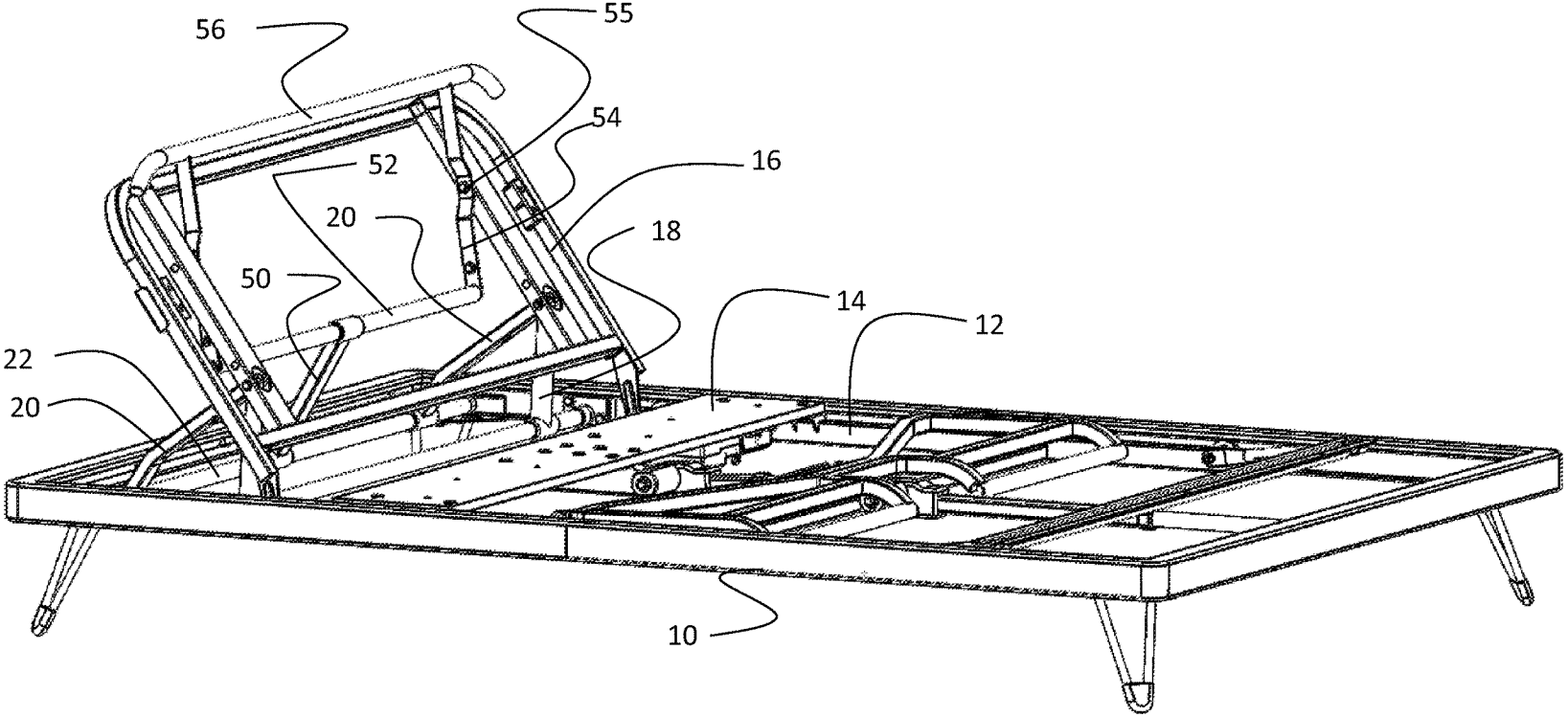

As shown in FIGS. 3 and 4 and best seen in FIG. 7, a tension link 50 is rotatably attached to rotating tube 22 at a first end and attached to a lateral tube 52 at a second end. The lateral tube 52 is attached to a first end of head tilt levers 54 which rotate about pivot attachments 55 on upper body support 16. The head tilt levers are attached at a second end to head bar 56. As the rotating tube 22 reaches the extent of track 24 and fixed length rotation arms 20 are placed in compression during the second range of motion of the carriage 12, tension link 50 causes rotation of the head tilt levers 54 through lateral tube 52 thereby urging the head bar 56 to additionally lift the head of the mattress support 15 from the upper body support section 16.

Figure 5:
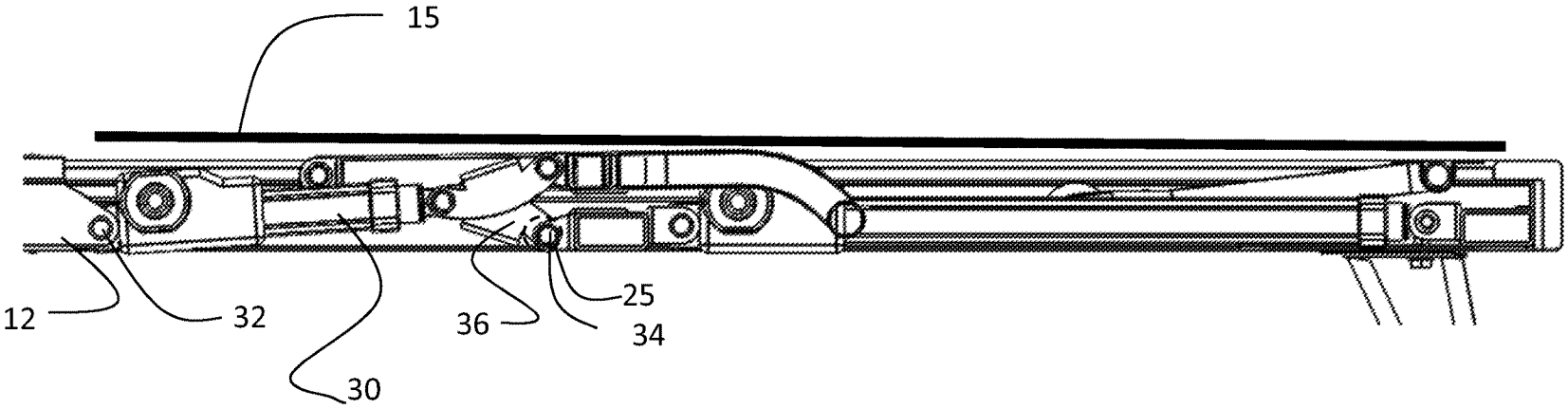
FIG. 5 is a side section view of a portion of the embodiment showing the leg support structure in the unarticulated position.
Figure 6:
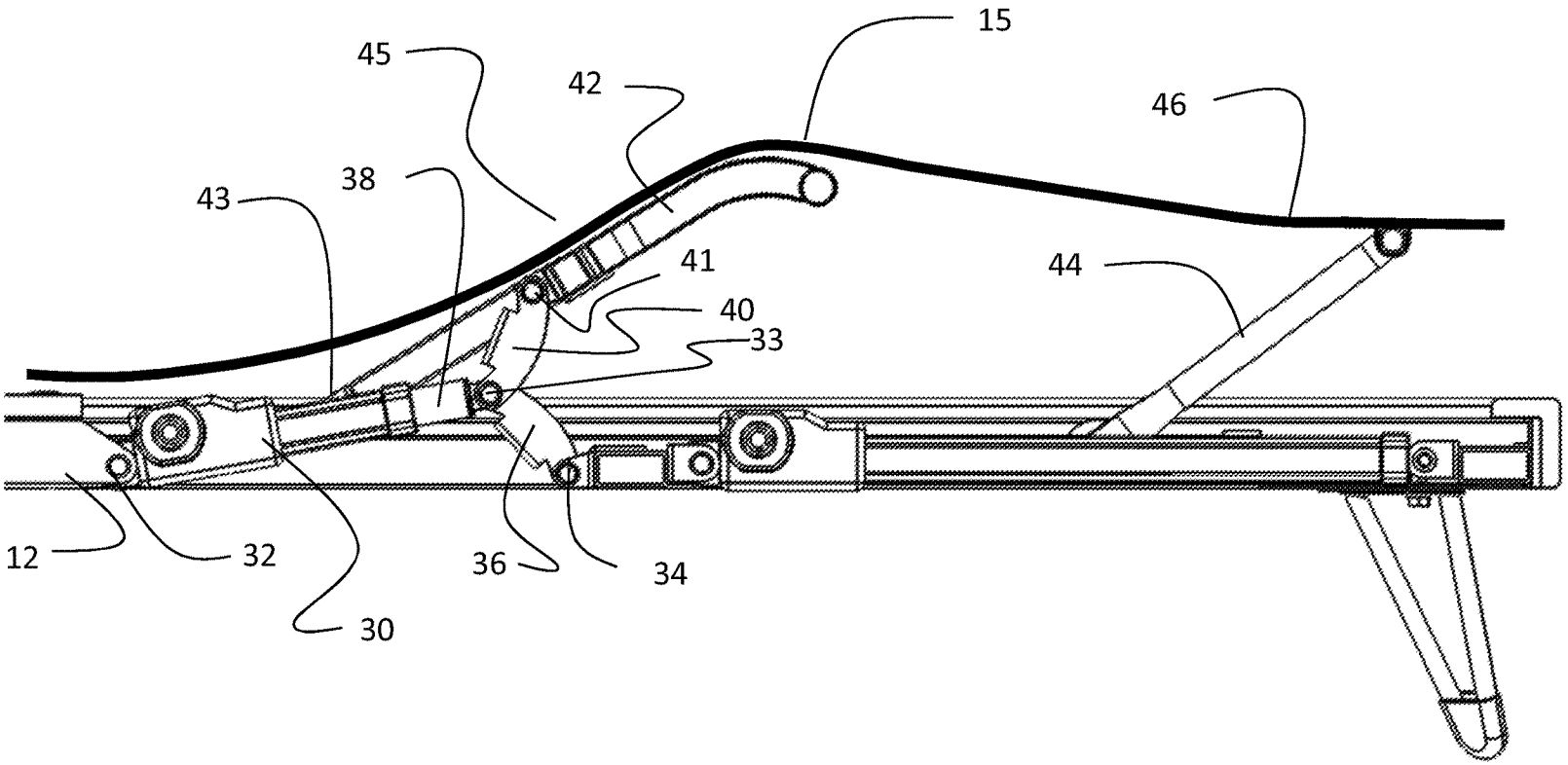
FIG. 6. is a side section view of a portion of the embodiment showing the leg support structure in the articulated position; and, FIG. 7 is a pictorial view of the embodiment with the upper body support structure in the fully articulated position.

As seen in FIG. 5 a second actuator 30 is attached to the foot end of the carriage 12 at a first rotation point 32 at a head of the actuator and a second rotation point 33 at a first end of a first leg 36. Upon extension of an actuator rod 38, the first leg 36 is placed in compression to react at a second end at a rotation point 34 on the carriage 20. A second leg 40 is attached at a first end to the second rotation point 33 on the actuator and at a second end to a third rotation point 41 on a thigh support section 42. Compression of the first and second legs between rotation point 34 and rotation point 41 causes first leg 36 and second leg 40 to cooperatively rotate upward. Second leg 40 is attached at the second end to the third rotation point 41 on the thigh support section 42 which rotates about hinges 43 attached to the carriage 12 as [see] *seen* in FIG. 6. The second actuator 30, first leg 36 and second leg 40 are also shielded within the vertical profile with the thigh support in an unrotated position (as best seen in FIG. 5). Fixed length reaction rods 44 pivotally attached to the carriage 12 at rotation point 47 and flexible mattress support 15 with brackets 48 cause relative rotation between the portion 45 of the flexible mattress support engaged by the thigh support section 42 and a lower leg support portion 46 (both shown slightly displaced from contact for clarity of the components). For the embodiment shown, rotation point 47 is an axle of the foot end wheels 25 of the carriage 12. A distal portion 49 of the thigh support section 42 is arcuate to contour the flexible mattress support in the elevated position as seen in FIG. 6.

Having now described various embodiments of the invention in detail as required by the patent statutes, those skilled in the art will recognize modifications and substitutions to the specific embodiments disclosed herein. Such modifications are within the scope and intent of the present invention as defined in the following claims.

What is claimed is:

1. An articulating bed comprising:

a support frame with a head end, a foot end and having side frame members;

a carriage having a seat support and carried by the side frame members, said carriage mounted with wheels engaging the side frame members to translate from a first position through a range progressing toward the head end to a [fully translated] *second* position;

an upper body support rotatably connected to the carriage and carrying a mattress support;

at least one telescoping rotation strut attached at a first end and rotating [through] *about* an axle pivotally attached to the side frame members, said at least one telescoping rotation strut engaging at a second end the upper body support whereby translation of the carriage from the first position [compressively urges the upper body support against] *engages* the telescoping rotation struts thereby *reacting in compression and* rotating the at least one telescoping rotation strut and upper body support during a first range of motion of the carriage; *and* at least one fixed length rotation arm carried at a first end by a rotating tube and pivotally attached to the upper body support at a second end, said rotating tube mounted on wheels constrained in a track, said rotating tube translating laterally in the track during the first range of motion and contacting [a] *the* track [end] proximate the head end of the frame at a termination of the first range of motion, said at least one telescoping strut approaching a vertical orientation at a termination of the first range of motion transferring reaction forces [to] *of* translation of the carriage to the at least one fixed length rotation arm, whereupon the at least one telescoping rotation strut extends through a second range of motion of the carriage to fully articulate the upper body support section with the carriage in the [fully translated] *second* position.

2. The articulating bed as defined in claim 1 further comprising a first actuator connected to a foot end of the support frame and operably engaging the carriage for translation.

3. The articulating bed as defined in claim 1 wherein the second end of the at least one fixed length rotation arm and the second end of the at least one telescoping rotation strut are commonly pinned for rotatable connection to the upper body support section.

4. The articulating bed as defined in claim 1 further comprising:

a tension link rotatably attached to the rotating tube at a first end and attached to a lateral tube at a second end;

head tilt levers attached at a first end to the lateral tube, said head tilt levers rotatable about pivot attachments on the upper body support, said head tilt levers attached at a second end to a head bar, whereby as the rotating tube reaches the track end and the at least one fixed length rotation arm is placed in compression during the second range of motion of the carriage, the tension link causes rotation of the head tilt levers through lateral tube thereby urging the head bar to additionally lift a head end of the mattress support from the upper body support section.

5. The articulating bed as defined in claim 1 further comprising:

an actuator attached to a foot end of the carriage;

a first leg attached at a first end to a rotation point on the carriage and at a second end to a second rotation point on an extension rod of the actuator;

a second leg connected to the first leg at the second rotation point;

a thigh support section rotatable about hinges attached to the carriage and connected to a second end of the second leg at a third rotation point whereby compression of the first leg by the actuator between the rotation point and second rotation point causes the first leg and second leg to cooperatively rotate upward, said second leg urging the thigh support section to rotate about the hinges.

6. The articulating bed as defined in claim 5 further comprising:

fixed length reaction rods pivotally attached to the carriage at a fourth rotation point;

brackets engaging the fixed length reaction rods to the mattress support, whereby relative rotation is induced between a portion of the flexible mattress support engaged by the thigh support section and a lower leg support portion.

7. The articulating bed as defined in claim 6 wherein the fourth rotation point comprises an axle of foot end wheels of the carriage.

8. An articulating support structure for a bed comprising:

a support frame with a head end, a foot end and having side frame members;

a carriage having a seat support and carried by the side frame members, said carriage mounted with wheels engaging the side frame members to translate from a first position through a range progressing toward the head end to a [fully translated] *second* position;

a first actuator connected to the support frame and operably engaging the carriage for translation;

an upper body support rotatably connected to the carriage and carrying a mattress support;

at least one rotation strut attached at a first end and rotating [through] *about* an axle pivotally attached to the side frame members, said at least one rotation strut engaging at a second end the upper body support whereby translation of the carriage from the first position [compressively urges the upper body support against] *engages* the at least one rotation strut thereby *reacting in compression and* rotating the at least one rotation strut and upper body support during a first range of motion of the carriage;

at least one rotation arm carried at a first end by a rotating tube and pivotally attached to the upper body support at a second end, said rotating tube mounted on wheels constrained in a track, said rotating tube translating laterally in the track during the first range of motion and contacting [a] *the* track [end] proximate the head end of the frame at a termination of the first range of motion, said at least one rotation strut approaching a vertical orientation at the termination of the first range of motion transferring reaction forces of translation of the carriage to the at least one rotation arm to fully articulate the upper body support section through a second range of motion until the carriage reaches the [fully translated] *second* position, said first actuator, at least one rotation strut and at least one rotation arm shielded within a vertical profile of the support frame in the first position.

9. The articulating support structure for a bed as defined in claim 8 wherein the at least one rotation strut is telescoping whereby translation of the carriage from the first position compressively urges the upper body support against the telescoping rotation strut thereby rotating the at least one telescoping rotation strut and upper body support during the first range of motion of the carriage and the at least one telescoping rotation strut extends through the second range of motion of the carriage to fully articulate the upper body support section with the carriage in the [fully translated] *second* position.

10. The articulating support structure for a bed as defined in claim 9 wherein the second end of the at least one fixed length rotation arm and the second end of the at least one telescoping rotation strut are commonly pinned for rotatable connection to the upper body support section.

11. The articulating support structure for a bed as defined in claim 8 further comprising:

a second actuator attached to a foot end of the carriage;

a first leg attached at a first end to a rotation point on an extension rod of the second actuator, said first leg attached at a second end to the carriage at a second rotation point;

a second leg connected to the rotation point;

a thigh support section rotatable about hinges attached to the carriage and connected to a second end of the second leg at a third rotation point whereby compression of the first leg by the actuator between the first rotation point and second rotation point causes the first leg and second leg to cooperatively rotate upward, said second leg urging the thigh support section to rotate about the hinges, said second actuator, first leg and second leg shielded within the vertical profile with the thigh support in an unrotated position.

*12. An articulating support structure for a bed comprising:*

*a support frame with a head end, a foot end, and side frame members;*

*a carriage having a seat support and carried by the side frame members, the carriage being mounted with wheels engaging the side frame members to translate from a first position through a range progressing toward the head end to a second position;*

*a first actuator connected to the support frame and operably engaging the carriage for translation;*

*an upper body support rotatably connected to the carriage;*

*at least one rotation strut attached at a first end and configured to rotate about an axle pivotally attached to the side frame members, the at least one rotation strut configured to engage at a second end the upper body support whereby translation of the carriage from the first position engages the at least one rotation strut thereby reacting in compression and rotating the at least one rotation strut and upper body support during a first range of motion of the carriage; at least one rotation arm pivotally attached to the upper body support,*

*wherein the at least one rotation strut is configured to approach a vertical orientation at the termination of the first range of motion transferring reaction forces of translation of the carriage to the at least one rotation arm through a second range of motion to fully articulate the upper body support until the carriage reaches the second position.*

* * * * *